United States Patent [19]

Inai et al.

[11] 3,846,480
[45] Nov. 5, 1974

[54] CHLORPHENESIN SUCCINATE AND ALKALI METAL SALTS THEREOF

[75] Inventors: Yuichi Inai; Kanzo Okazaki, both of Tokyo; Katsutoshi Shimada, Saitama; Kengo Kagei; Motoaki Bessho, both of Tokyo, all of Japan

[73] Assignee: Eisai Co., Ltd., Tokyo, Japan

[22] Filed: Aug. 28, 1972

[21] Appl. No.: 284,357

[30] Foreign Application Priority Data
Sept. 3, 1971  Japan.................................. 46-67494

[52] U.S. Cl.............................. 260/485 G, 424/313
[51] Int. Cl............................................. C07c 69/40
[58] Field of Search................................ 260/485 G

[56] References Cited
UNITED STATES PATENTS

| | | | |
|---|---|---|---|
| 2,586,661 | 2/1952 | Jacob et al...................... | 260/485 G |
| 2,663,727 | 12/1953 | Gailliot et al................... | 260/485 G |
| 2,988,481 | 6/1961 | Gregory.......................... | 260/485 G |

*Primary Examiner*—Lorraine A. Weinberger
*Assistant Examiner*—E. Jane Skelly
*Attorney, Agent, or Firm*—Woodhams, Blanchard and Flynn

[57] ABSTRACT

Chlorphenesin succinate and its alkali metal salts are prepared by reacting chlorphenesin with succinic anhydride to form chlorphenesin succinate and converting it to an alkali metal salt.

3 Claims, No Drawings

CHLORPHENESIN SUCCINATE AND ALKALI METAL SALTS THEREOF

BACKGROUND OF THE INVENTION

1. Field of the Invention

This invention relates to chlorphenesin succinate, alkali metal salts thereof and a method of making same.

2. Description of the Prior Art

Chlorphenesin has been known as a skeletal muscle relaxant and as an antibacterial agent. Recently, it has been appreciated that chlorphenesin has anti-allergic activity.

However, the solubility of chlorphenesin in water is low, not exceeding 1 percent, and it is difficult to prepare an injection formulation or aqueous solution containing chlorphenesin at a high concentration. When admixed with ethylurea or propyleneglycol, chlorphenesin exhibits a relatively improved solubility but it is still insufficient in exhibiting its pharmacological activity.

SUMMARY OF THE INVENTION

A primary object of this invention is to provide water-soluble chlorphenesin derivatives which are much more suitable for preparation of injection formulations or aqueous solutions than is chlorphenesin itself.

Another object of this invention is to provide chlorphenesin derivatives having a superior anti-allergic activity in comparison to chlorphenesin.

We have now discovered new chlorphenesin succinate and its alkali metal salts, which are suitable for attaining the above objects.

The chlorphenesin succinate of the following formula (I) and its alkali metal salts can be produced by reacting chlorphenesin of the following formula (II) with succinic anhydride to form chlorphenesin succinate (I) and converting it to an alkali metal salt.

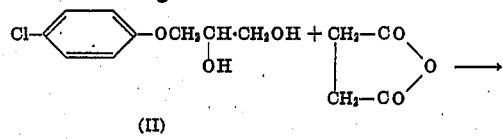

(II)

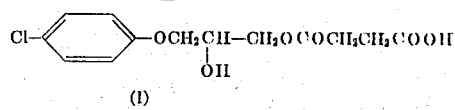

(I)

The reaction of chlorphenesin with succinic anhydride according to the present invention is carried out in an inert solvent. Any inert solvents may be used as a reaction solvent, but use of, for example, benzene is preferable. Sodium acetate, pyridine, etc. are used as a condensation catalyst. The reaction is carried out at a temperature in the range of from room temperature to the reflux temperature of the solvent to be used. After the reaction is completed, isolation of chlorphenesin succinate may be accomplished by a conventional method such as, for example, extraction and solvent distillation. If necessary, the recrystallization of the product is carried out from a solvent such as chloroform and isopropyl ether. Formation of alkali metal salts of chlorphenesin succinate of above formula (I) may be accomplished by employing known alkali metal bases such as sodium hydroxide, potassium hydroxide and sodium carbonate. Sodium salt and potassium salt are most preferable.

Alkali metal salts of chlorphenesin succinate prepared in accordance with this invention can readily be dissolved in water. For instance, 1 g of the sodium salt can readily be dissolved in 1 ml of water to form a transparent solution. Accordingly, it is possible to obtain high concentration injection formulations for subcutaneous, intramuscular or intravenous injection and high concentration aqueous solutions by utilizing alkali metal salts of chlorphenesin succinate prepared according to this invention.

Compositions containing the chlorphenesin derivatives according to the present invention can take the form of tablets or other type of medicaments.

Chlorphenesin succinate and its alkali metal salts such as sodium and potassium salts of this invention is much superior to chlorphenesin with respect to the anaphylactic histamine release-preventive effect.

As is seen from data of the acute toxicity shown in the Table given below, the toxicity of chlorphenesin succinate is very low.

Table

Acute Toxicity of Chlorphenesin Succinate in Rats

| Route | *Sex | Drug Concentration (%) | Administered Volume ml/100 g body wt. | Dose mg/kg | Number of Death within | | | | Cumulative Morality during 2 Weeks | LD$_{50}$ mg/kg |
|---|---|---|---|---|---|---|---|---|---|---|
| | | | | | 1 hr | 24 hrs | 48 hrs | 72 hrs | | |
| Oral | m | 40 | 1.0 | 4000 | 0 | 1 | 0 | 0 | 1/5 | 4000 |
| | f | 40 | 1.0 | 4000 | 0 | 0 | 1 | 0 | 1/5 | |
| Subcutaneous | m | 20 | 0.5 | 1000 | 0 | 0 | 0 | 0 | 0/5 | 1000 |
| | f | 20 | 0.5 | 1000 | 0 | 0 | 0 | 0 | 0/5 | |
| Intramuscular | m | 20 | 0.5 | 1000 | 0 | 0 | 0 | 0 | 0/5 | 1000 |
| | f | 20 | 0.5 | 1000 | 0 | 0 | 0 | 0 | 0/5 | |
| Intravenous | m | 20 | 0.5 | 1000 | 0 | 1 | 0 | 0 | 1/5 | 1000 |
| | f | 20 | 0.5 | 1000 | 1 | 0 | 0 | 0 | 1/5 | |

* m: male, f: female

DESCRIPTION OF THE PREFERRED EMBODIMENTS

This invention will now be illustrated in more detail by reference to examples, but the scope of this invention is not limited by them at all.

EXAMPLE 1

Preparation of Chlorphenesin Succinate

A mixture of 60 g of chlorphenesin, 29.6 g of succinic anhydride, 12 g of sodium acetate and 200 ml of benzene was heated to reflux for 4 hours under stirring. The reaction mixture was extracted with an aqueous solution of sodium carbonate, and the aqueous layer was separated and made acidic by hydrochloric acid to form an oily substance. The oily substance was extracted with ethyl acetate. The extract was dried on magnesium sulfate, and then, the ethyl acetate was distilled off to obtain crude crystals. Recrystallization of the crude crystals from a mixture of chloroform and isopropyl ether gave 50 g of chlorphenesin succinate having a melting point of 90.1°C. Results of the elementary analysis of the product are as follows:

|  | C | H | Cl |
|---|---|---|---|
| Calculated | 51.58 | 4.99 | 11.71 |
| Found | 51.51 | 4.89 | 11.77 |

Preparation of Sodium Salt of Chlorphenesin Succinate 5 g of chlorphenesin succinate was dissolved in methanol, and to the resulting solution was added a methanol solution containing sodium hydroxide in an amount equimolar to chlorphenesin succinate. The mixture was concentrated under reduced pressure, and the resulting residue was washed with ether to obtain 5.2 g of the sodium salt of chlorphenesin succinate having a decomposition temperature exceeding 250°C.

Results of pharmacological tests made on chlorphenesin succinate (which will be abbreviated as "CPS" hereinbelow) will now be described. For the sake of comparison, chlorphenesin (which will be abbreviated as "CP" hereinbelow) was also tested.

Experiment 1
Test of Effects of Preventing Release of Histamine by Antigen-Antibody Reaction Male rats having a body weight of 300 – 400 g were sensitized by the method of Noru disclosed in Acta Pharmacologica et Toxicologica, 25, 456–460 (1967). Mast cells and leucocyte cells were collected by the method of Uvnas disclosed in Experimental Cell Research, 23, 45–57 (1961) and Experimental Research, 18, 512–520 (1959).

Experiments were carried out in the following manner.

Each buffer solution (0.4 ml) of CPS or CP was added to 0.5 ml of a suspension of mast cells, and the mixed liquor was allowed to stand still at 37°C. for 15 minutes. Then, 0.2 ml of equine serum was added to the mixed liquor, and it was allowed to stand still at 37°C. for another 15 minutes. The mixed liquor was centrifuged for 5 minutes, and the amount of histamine contained in the supernate was biochemically measured by employing atropine-treated intestine pieces of a guinea pig. Samples of CPS and CP were used at the following three levels, namely $2 \times 10^{-3}$M, $2 \times 10^{-4}$M and $2 \times 10^{-5}$M. Results are shown in Table 1.

Table 1

Histamine Release-Preventive Effect of CP and CPS on Mast Cells Incorporated with Antigen (Percent Prevention)

|  | $2 \times 10^{-3}$M | $2 \times 10^{-4}$M | $2 \times 10^{-5}$M |
|---|---|---|---|
| CP | 62.26 % | 7.55 % | 0 % |
| CPS | 83.02 % | 24.53 % | 0.94 % |

A higher value means a higher effect of preventing the histamine release.

Tests on effects of preventing the histamine release were conducted with use of leucocyte cells in the same manner as above. Results are shown in Table 2.

Table 2

Histamine Release-Preventive Effect of CP and CPS on Separated Leucocytes Incorporated with Antigen (Percent Prevention)

|  | $2 \times 10^{-3}$M | $2 \times 10^{-4}$M | $2 \times 10^{-5}$M |
|---|---|---|---|
| CP | 65.18 % | 52.68 % | 19.64 % |
| CPS | 83.04 % | 56.36 % | 25.0 % |

A higher value indicates a higher effect of preventing the histamine release.

Experiment 2
Test on Influences of CP and CPS on Passive Cutaneous Anaphylaxis Reaction (PCA Reaction)

A guinea pig was hypodermically injected with albumen antiserum of rabbit. Three hours later, the guinea pig was intravenously injected with an antigen (albumen), 1 percent Evans Blue and CPS or CP.

Thirty minutes later, the diameter of a blue ring spot appearing on the skin and the amount of the dye extracted from the skin at the skin at the blue ring spot were measured. The serum was used in the state diluted 300 times or 1,000 times. Results are shown in Table 3, from which it is seen that CPS inhibits occurrence of PCA reaction very conspicuously as compared with CP tested as comparison.

Table 3

| | Influences of CP and CPS on PCA Reaction | | | |
|---|---|---|---|---|
| | Diameter of Blue Ring Spot (mm) | | Amount of Extracted Dye (mcg) | |
| Serum Dilution Degree Amount Used (mg/Kg) | 300 times | 1200 times | 300 times | 1200 times |
| Control | 15.8 | 10.0 | 6.14 | 2.08 |
| CP, 52.8 mg/Kg | 7.85 | 2.0 | 1.98 | 0.23 |
| CP, 13.2 mg/Kg | 13.3 | 5.3 | 7.3 | 1.18 |
| CPS, 79.2 mg/Kg | 0 | 0 | 0 | 0 |
| CPS, 19.8 mg/Kg | 5.2 | 1.6 | 0.86 | 0.61 |

A lower value of either the blue ring spot diameter or the amount of extracted dye indicates a higher effect of inhibiting PCA reaction.

What we claim is:

1. A chlorphenesin derivative selected from the group consisting of chlorphenesin succinate having the formula

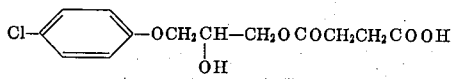

and its alkali metal salts.

2. The compound as claimed in claim 1, consisting of the potassium salt of chlorphenesin succinate.

3. The compound as claimed in claim 1, consisting of the sodium salt of chlorphenesin succinate.

* * * * *